United States Patent [19]

Dietz et al.

[11] Patent Number: 5,196,968
[45] Date of Patent: Mar. 23, 1993

[54] MAGNETIC TAPE CASSETTE APPARATUS HAVING A MICROPROCESSOR CONTROLLED SERVO ROD AND TAPE DEVICE

[75] Inventors: Hans-Werner Dietz, Ehringshausen; Karl Klos-Hein, Wettenberg; Horst-Hermann Rumpf, Herborn-Schönbach, all of Fed. Rep. of Germany

[73] Assignee: U.S. Philips Corporation, New York, N.Y.

[21] Appl. No.: 758,027

[22] Filed: Sep. 12, 1991

Related U.S. Application Data

[63] Continuation of Ser. No. 683,083, Apr. 9, 1991, abandoned, which is a continuation of Ser. No. 366,701, Jun. 14, 1989, abandoned.

[30] Foreign Application Priority Data

Jun. 16, 1988 [DE] Fed. Rep. of Germany ....... 3820501
May 10, 1989 [DE] Fed. Rep. of Germany ....... 3915201

[51] Int. Cl.⁵ ...................... G11B 15/02; G11B 21/02
[52] U.S. Cl. ......................................... 360/69; 360/75
[58] Field of Search ............................... 260/69, 71–78, 260/105, 137

[56] References Cited

U.S. PATENT DOCUMENTS 4,402,020  8/1983  Yokota et al. ...................... 360/72.1
4,649,446  3/1987  Deutsch et al. ...................... 360/105
4,757,405  7/1988  Laudus ................................. 360/105

Primary Examiner—Robert S. Tupper
Attorney, Agent, or Firm—Brian J. Wieghaus

[57] ABSTRACT

The invention relates to a deck for a magnetic tape cassette apparatus comprising a capstan drive motor and an axially movable servo rod which is driven by a servo motor via a servo drive. The movement of the servo rod controls functional parts of the apparatus such as a head-mounting plate, a loading mechanism, and a switching mechanism, with the aid of a microprocessor which receives switching signals, and a control device for the servo motor. The micrprocessor derives the positions of a servo rod, a mechanical switching member, and an electrical switch and generates control commands for the apparatus based on the position of these elements.

20 Claims, 8 Drawing Sheets

MAGNETIC TAPE CASSETTE APPARATUS HAVING A MICROPROCESSOR CONTROLLED SERVO ROD AND TAPE DEVICE

This is a continuation of copending, U.S. Ser. No. 683,083 filed Apr. 9, 1991, now abandoned which is a continuation of Ser. No. 366,701 filed Jun. 14, 1989, now abandoned.

BACKGROUND OF THE INVENTION

The invention relates to a deck for a magnetic tape cassette apparatus comprising a capstan drive motor and an axially movable servo rod which is driven by a servo motor via a servo mechanism. The movement of the servo rod controls functional parts of the apparatus, such as a head-mounting plate, a loading mechanism and a switching mechanism, a microprocessor, which receives switching signals, and a control device for the servo motor.

In magnetic-tape-apparatuses intended for playing tape cassettes, in particular Compact Cassettes, it is known to change the position of the magnetic head relative to the magnetic tape in the cassette. This is effected by moving a head-mounting plate carrying the magnetic head. It is also common practice to provide a loading mechanism adapted to receive a Compact Cassette and to bring the inserted Compact Cassette into a play position. For this purpose a lifting device is employed. In apparatuses of the auto-reverse type, having two playing directions, the tape-transport direction typically depends on the direction of rotation of the motor, pressure rollers being pressed against a first or a second capstan and the turntables for the magnetic tape being driven alternately in one direction or the other.

Moreover, DE 33 15 882.3 CS describes a magnetic-tape apparatus in which a servo-rod can be driven in each of its axial directions by means of a motor in order to perform loading functions, and switching functions between the transport directions. To perform these functions the servo rod must always be set to a reference position to which the various functions are referred. This is both mechanically and electrically intricate and requires much time between the instant at which a play function is stopped and another function is started.

It is also known to drive the turntables of the deck directly by means of a motor for the purpose of winding or rewinding the tape in the cassette. Such a device system enables friction couplings to be dispensed with, but as a separate drive unit, it constitutes an intricate construction.

SUMMARY OF THE INVENTION

It is an object of the invention to provide a servo and control mechanism for a magnetic-tape-cassette apparatus, which mechanism simplifies the construction of the apparatus and which enables the control and actuating functions to be performed by means of a minimal number of electrical and mechanical parts.

According to the invention this object is achieved in that:

a) a switching means supplies switching signals to the microprocessor and is constructed to be switched by the servo rod and by a mechanical switching member. The switching member can perform movements independent of the servo rod but during servo operation the servo rod determines the position of the switching member relative to the servo rod;

b) from the switching signal received upon every mechanical actuation by the servo rod or the switching member, the microprocessor derives the instantaneous geometrical positions of the switching means, of the servo member, and/or the switching member from the position of the switching means and the previously received and stored last switching signal;

c) the microprocessor converts the switching signal from the switching means into control commands for the servo motor, the servo drive and turntable drive, the capstan drive motor and an electromagnetic holding device for the head-mounting plate, which plate is held in the play position or the fast wind position by means of said electromagnetic holding device.

Between the instant of starting and the beginning of the playing mode all the tape deck functions, both of a mechanical and of an electrical kind proceed directly, either mechanically or electrically, from the servo rod via the switching means which cooperates with the microprocessor. The actuation of the head mounting plate and the changeover of the turntable and servo drive are effected mechanically by the servo rod and the switching member. In this respect it is also important that the servo rod controls when the switching member is allowed to perform movements which are independent of this rod.

The microprocessor is programmed in such a way that it not only performs the electrical conversion of switching signals from the switching means into control commands, but also effects a self-orientation to ascertain the instantaneous servo-function status of the deck, for example, by proceeding to the next switching point provided to perform switching functions. For this purpose the microprocessor employs the information of the previously received last switching signal stored in it and the information about the instantaneous position of the switching means provided by the new switching signal. Thus, for example when the power has been turned off and is subsequently switched on again, the microprocessor is capable of detecting via the servo rod an adjacent switching point in some phase of the servo operation in order to derive the required control commands for the servo motor, the capstan drive motor, and the electromagnetic holding device.

This division into mechanical and electrical/electronic function monitoring enables short access times to be obtained for the individual tape deck functions, which is very important for the ease of operation of an apparatus. A substantial reduction of the number of parts is obtained.

In a further embodiment of the invention the switching means is a switch which supplies a switching signal when it is opened and closed by means of a switch actuator. Such a switch is simple and reliable; opening and closing can be detected by the microprocessor.

In a further embodiment of the invention the microprocessor defines the direction of rotation of the servo motor via the control device and switches the voltage supply to the servo motor between a high supply voltage, for the actuation of the loading and servo mechanism and for fast winding, and a low supply voltage for the turntable drive during the play mode. The high supply voltage of the servo motor enables the servo movements to be performed rapidly and a cassette to be rewound within a comparatively short time. The low supply voltage enables either the one or the other turntable to be driven with the same servo motor.

In a further embodiment of the invention the control device comprises push-pull power amplifiers arranged in the motor-supply lines. Such amplifiers provide a convenient servo-motor drive.

In a further embodiment of the invention the control device comprises a pulse detector which detects operating functions of the servo motor via the voltage supply of the power amplifiers. Detection is effected in such a way that the voltage supply lines of the power amplifiers are connected to a differentiating network, which derives pulses which can be counted from the pulsating direct voltage of the motor. A commutator servo motor operated with direct current interrupts the current flowing in the motor at the commutation instant. These commutation interruptions are employed to obtain pulses which can be counted.

In a further embodiment of the invention the pulses are applied from the differentiating network to the microprocessor via a monostable multivibrator, the microprocessor counting the pulses to derive time values. Such time values can be used for speed control of the motor, length-of-tape detection or tape stop detection.

In a further embodiment of the invention the microprocessor determines the actual time intervals between successively received switching signals and compares them with stored nominal time intervals. The microprocessor switches the servo motor to the direction of rotation for the eject mode in the case of impermissible differences in time. This enables the microprocessor to perform monitoring functions in that it detects, for example, whether the time required by the servo rod to move from a switching point of the switching means to the next switching point exceeds a specific nominal time. When the nominal time is exceeded this may be indicative of a fault. In the case that the nominal time is exceeded the microprocessor switches the servo motor to the eject direction.

In a further embodiment of the invention the servo rod enables the mechanical switching member to perform independent movements each time that the end of the servo mode is reached. In order to initiate the play mode, the independent movement of the switching member electrically causes the capstan drive motor to be started and the supply voltage to the servo motor to be reduced by actuation of the switching member and causes the servo motor drive to be changed over mechanically from servo drive (servo rod) to tape drive (turntables). At the end of a servo movement of the servo mechanism several mechanical and electrical switching functions occur in order to start the play mode. Electrically the servo motor should be prepared for the play mode, the capstan drive motor should be started and, if muting of the amplifier is not needed, it should be discontinued. Mechanically the servo motor drive should be changed over from servo drive to turntable drive. With the present construction of the apparatus this is possible via only the switching member.

In a further embodiment of the invention the servo motor drive is constructed as a dual-function drive comprising reduction gear trains adapted to the servo rod drive and the turntable drive, and the efficiency of the reduction gear train for the turntable drive is selected in such a way that the torque speed characteristic of the servo motor acting at the turntables is adapted to the winding speed/winding torque characteristic in such a way that the tape pull at the take-up turntable is substantially constant as a function of the winding speed and the varying tape-roll diameter, the adaptation parameters being the $n/M_{mo}$ characteristic of the servo motor, the reduction ratio and the efficiency in conjunction with the gear wheel material combination. Such an optimization enables a friction coupling between the drive system and the turntables to be dispensed with. This eliminates a disturbing factor in the tape drive because friction couplings constitute a difficult-to-control factor on account of the huge temperature differences in a deck intended for use in a car radio. In a car radio allowance is to be made for ambient temperatures of, for example, $-30°$ C. up to $+80°$ C. There is no friction coupling which can meet these extreme requirements. The absence of the friction coupling leads to a significant improvement of the tape-transport quality.

BRIEF DESCRIPTION OF THE DRAWINGS

The invention will now be described in more detail, with reference to the drawings. In the drawings.

DESCRIPTION OF THE PREFERRED EMBODIMENTS

Figure 1:
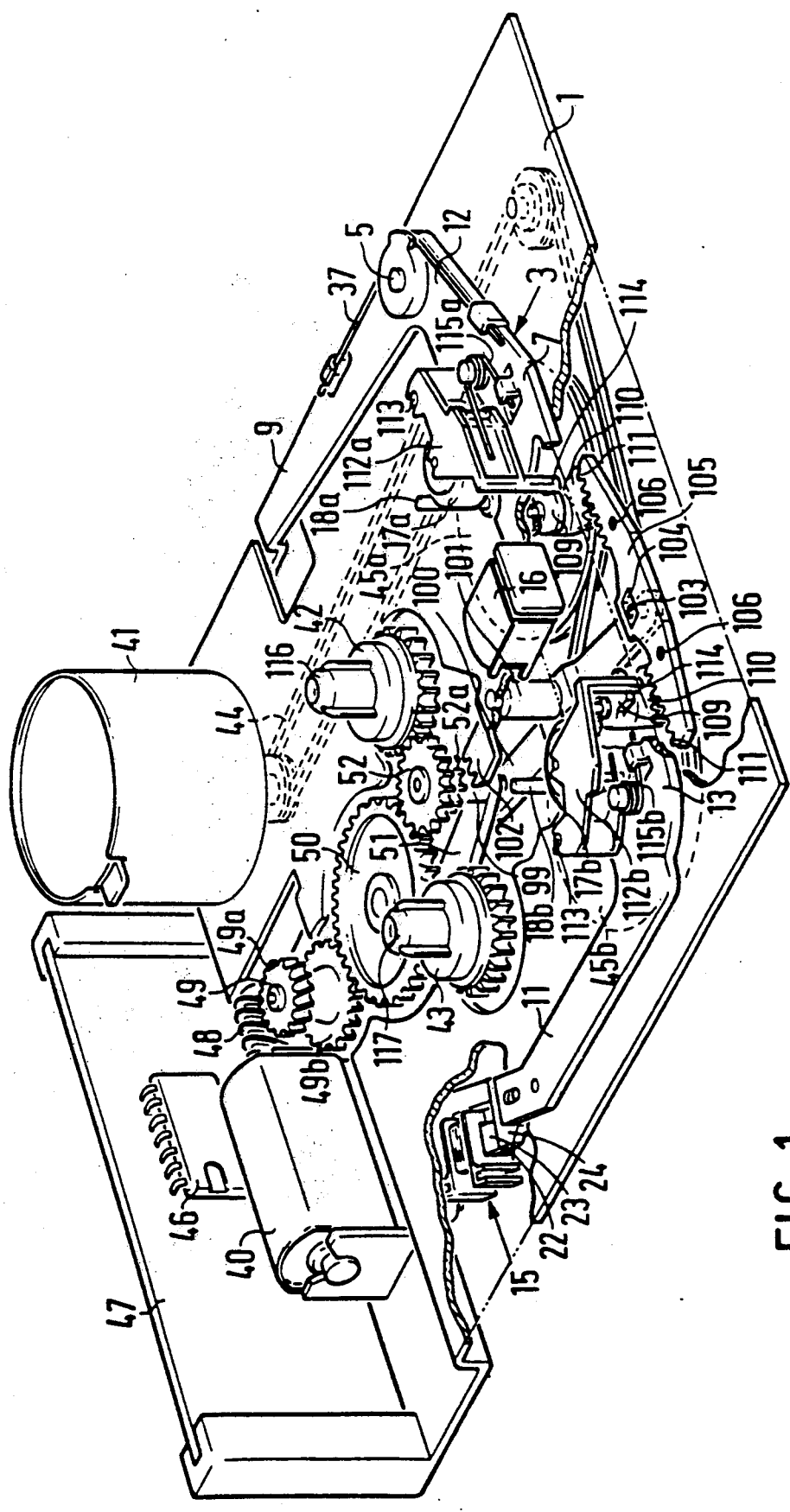
FIG. 1 is a perspective view of the tape-deck of a magnetic-tape apparatus.
Figure 2:
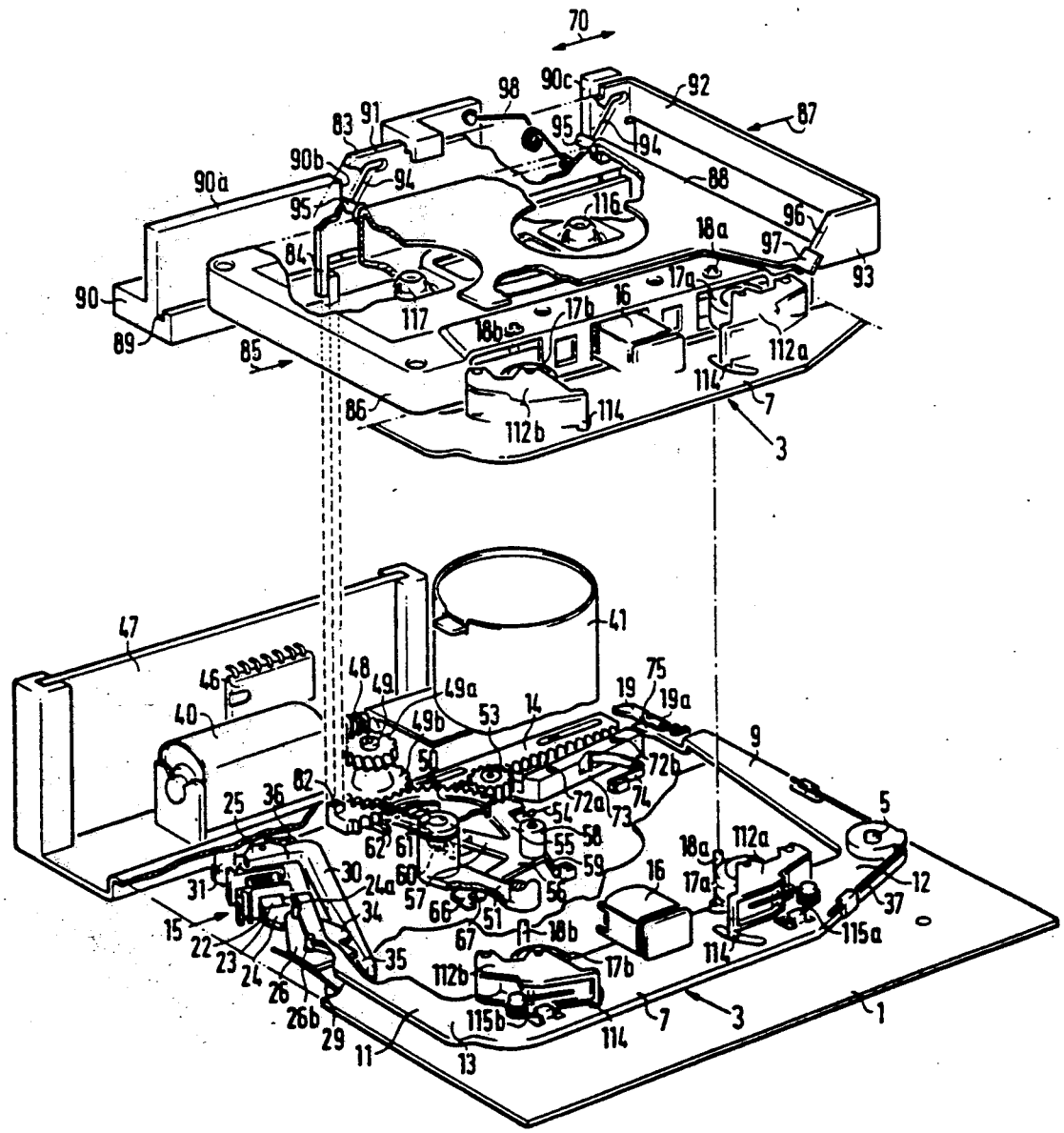
FIG. 2 is an exploded diagrammatical view of the lift mechanism and the control mechanism for a head-mounting plate and for the lift mechanism.

FIGS. 1 and 2 show a deck plate 1 which serves as the chassis of a magnetic-tape-cassette apparatus comprising a head-mounting plate 3 which is pivotable about an eccentric pivot 5. The head-mounting plate 3 is U-shaped and comprises a first limb 9 and a second limb 11 which project from the ends of its base 7 in the same direction. At the location where the limbs 9 and 11 are connected to the base, corner portions 12 and 13 are formed. The first limb 9 is adapted to cooperate with a servo rod 14 (not shown in FIG. 1) and the second limb 11 constitutes a functional element which is adapted to cooperate with an electromagnetic holding device 15.

The base 7 of the head-mounting plate 3 carries a magnetic head 16 and pressure rollers 17a, 17b which are pivotable relative to the base 7. The pressure rollers 17a and 17b can be applied to the capstans 18a and 18b to move the magnetic tape past the magnetic head 16 in one direction or the other.

The head-mounting plate 3 is pivoted via the servo rod 14. This servo rod 14 acts on a spring-loaded transport projection 19 which is pivotally arranged on a limb 9. By means of the servo rod 14 the head-mounting plate 3 can be pivoted clockwise about the eccentric pivot 5 each time that it is actuated by means of the servo rod 14.

The electromagnetic holding device 15 comprises a magnet coil 20 whose inner space 21 (FIG. 3) is traversed by limbs of U-shaped magnetically isolated armatures 22, 23. The two armatures 22, 23 are superimposed, the relevant armature limbs 22a, 23a overlapping one another pairwise. The yokes 22b, 23b are situated at opposite coil ends 20a, 20b. The electromagnetic holding device 15 is fixed to the deck plate 1.

The free ends of the armature limbs are formed with polepieces 23c and 22c which are adapted to cooperate with a first armature plate 24 and a second armature plate 25. By means of a pin 24a the first armature plate 24 is pivotably mounted on a slide 26. The pin 24a on this slide 26 engages a guide slot 27 in the limb 11. A guide pin 26b of the slide 26 is guided in an arcuate slot 28 in the limb 11. The slot 28 extends obliquely towards the electromagnetic holding device 15 along an arcuate path. A spring 29 ensures that the guide pin 26b normally engages the end portion 28a of the arcuate slot 28. In this position the slide 26 extends above and parallel to the limb 11.

The second armature plate 25 is arranged on an arm 30 so as to be pivotable by means of a pin 25a. The L-shaped arm 30 has a shorter arm portion 30a carrying the second armature plate 25 and at its end 30b it is pivotable in the directions indicated by double arrow 32 about a pivot 31. A longer arm portion 30c extends parallel to the magnet coil 20 up to a lateral surface 33 of the slide 26 where it terminates in the proximity of a nose 34 of the slide, which nose has an inclined surface 35.

When applied to the polepieces 23c and 22c respectively, the armature plates 24 and 25 can stick to the polepieces if the magnet coil 20 is energised. In this way they define two operating positions of the head-mounting plate 3 as long as the magnet coil 20 is energised. Depending on whether one or both plates has/have been applied one or both armature plates is/are released when the magnet coil 20 is de-energised and a spring 37, which acts on the base 7 of the head-mounting plate 3, can pivot the head-mounting plate 3 anti-clockwise into a rest position. The holding electromagnet device is described comprehensively in DE Patent Application P 37 14 704.8.

Figure 5:
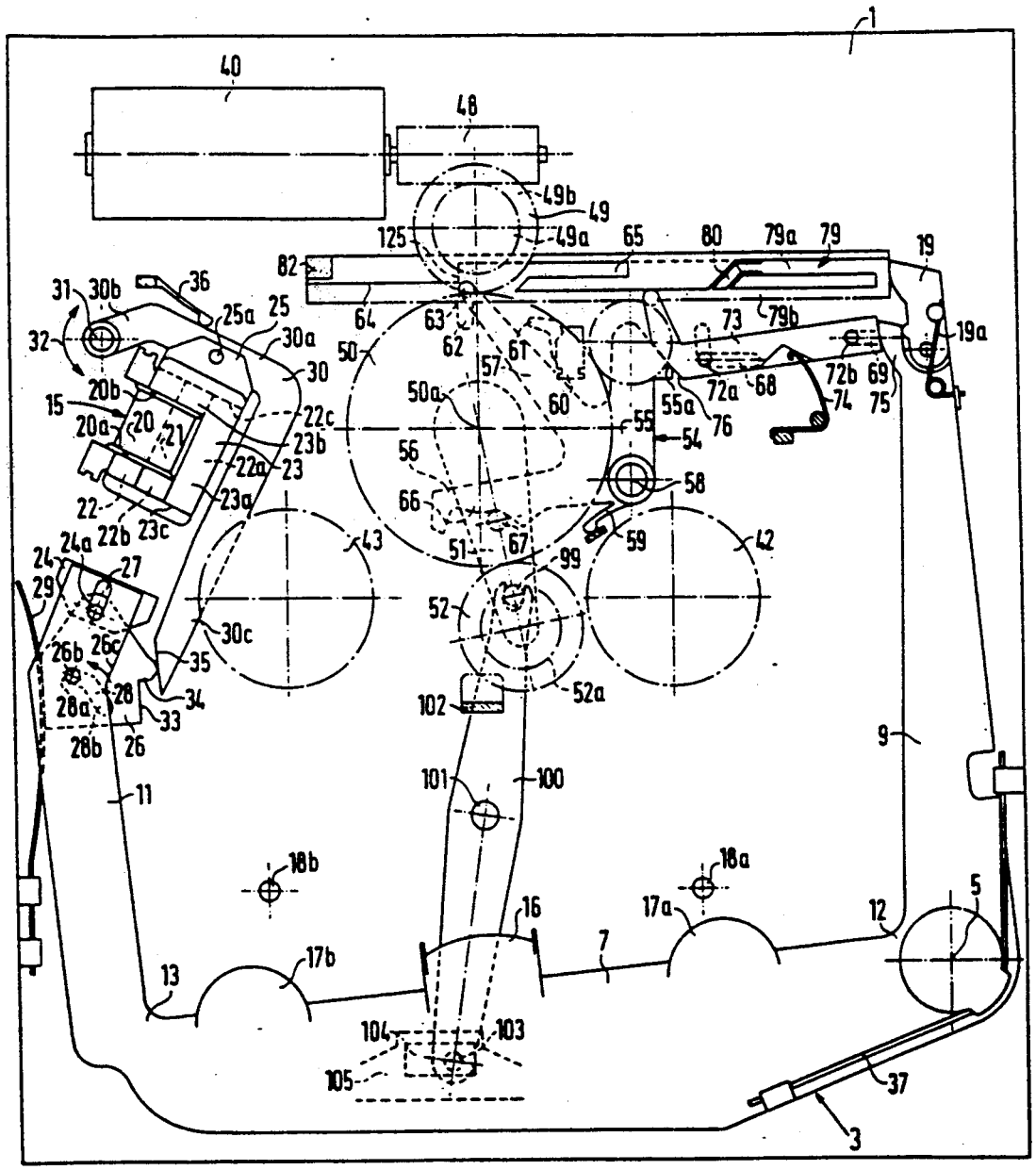
FIG. 5 shows the mechanism of FIG. 3 in the standby position.

How the head-mounting plate cooperates with the holding electromagnets will now be explained by describing the operation of these magnets. FIG. 5 shows the stand-by or rest position.

Figure 4:
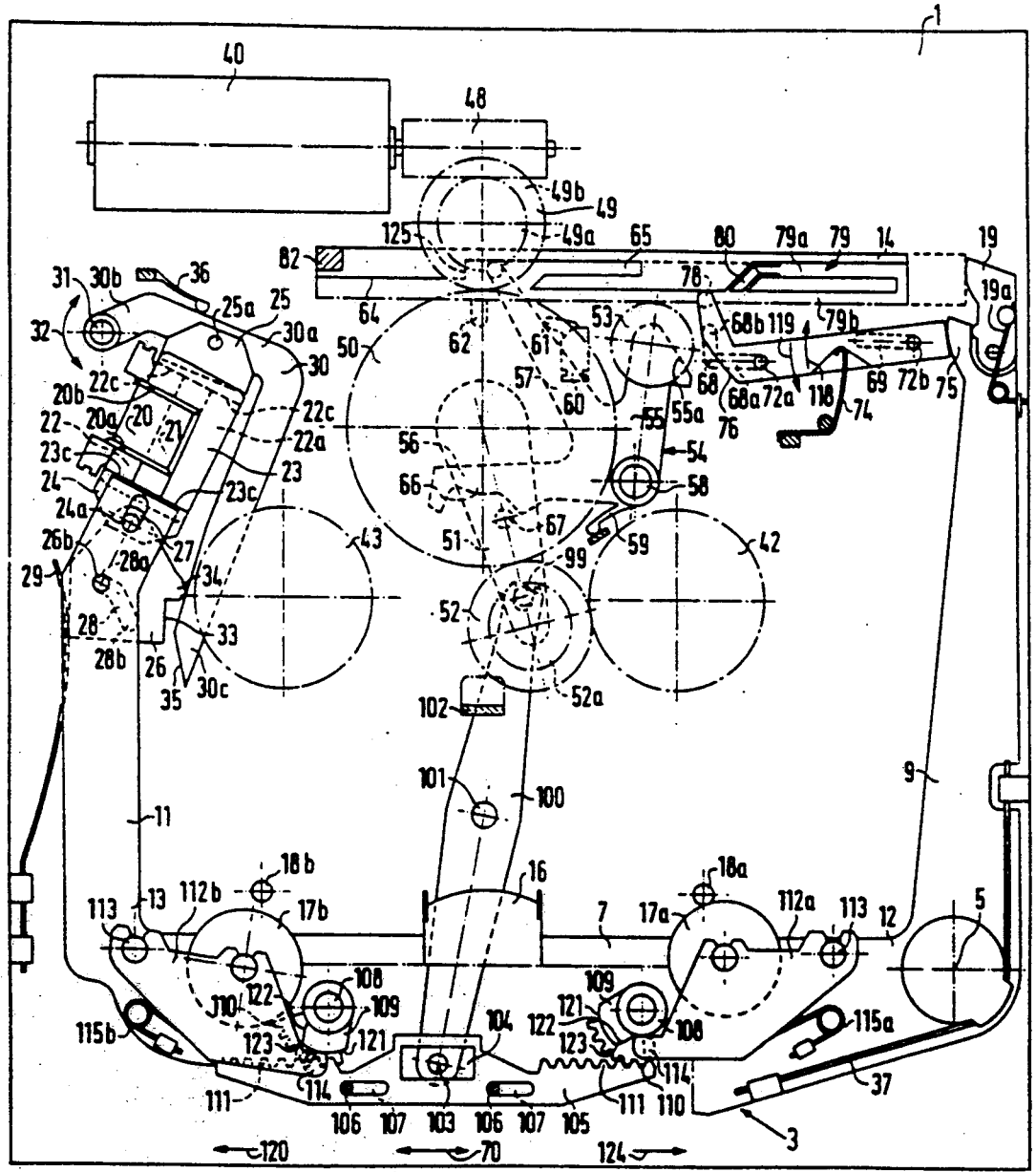
FIG. 4 shows the mechanism of FIG. 3 in its play position.

The magnet coil 20 is not energised and the armature plate 24 is clear of the polepieces 23c of the armature iron 23. The armature plate 25 is constantly urged against the polepieces 22c by a spring 36. The spring 37 ensures that the head-mounting plate 3 is pivoted anti-clockwise into the rest or stand-by position. Both the magnetic head 16 and the pressure rollers 17a and 17b are fully clear of a magnetic tape, not shown, which moves between the pressure-roller/capstan pairs 17a, 18a/17b, 18b past the magnetic head 16. If the head-mounting plate is to be pivoted into and held in the play position, i.e. a first operating position (FIG. 4), the servo rod 14, in the position indicated in broken lines, abuts against the transport projection 19, causing the head-mounting plate 3 to be pivoted clockwise. The magnet coil 20 remains de-energised for the time being. As the head-mounting plate 3 is pivoted clockwise, the limb 11 is moved towards the holding electromagnet device 15. The nose 34 of the slide 26 abuts against the inclined surface 35 of the longer arm portion 30c. The spring 36 is so weak that the nose 34 presses the surface 35 and hence the longer arm portion 30c outwards in the anti-clockwise direction. The guide pin 26b remains in the end portion 28a. The functional element 11 positions the first armature plate 24 against he polepieces 23c. Now the magnet coil 20 is energised and the armature plate 24 is held against the polepieces 23c (FIG. 4). Thus the head-mounting plate 3 is also held in the play position, i.e. the first operating position. If the play mode has ended or if it is required to change over to fast forward or reverse operation, the magnet coil 20 is de-energised and the spring 37 causes the head-mounting plate to be returned into the rest or stand-by position in the anti-clockwise direction. From this rest or stand-by position it is possible to proceed to the fast-wind or the play position. How the play position is reached has already been described in the foregoing. How the fast-wind position (FIG. 6), i.e. the second operating position, is reached and held will be described hereinafter. To reach the fast-wind position (FIG. 6) the magnet coil 20 is energised. The second armature plate 25 is already positioned against the polepieces 22c and now the magnetic holding force assists the force exerted by the spring 36. Thus, it has become more difficult to pivot the longer arm portion 30c away in the anti-clockwise direction. The servo rod 14 perform one forward movement to pivot the head-mounting plate 3 in the clockwise direction. Now the nose 34 of the slide 26 cannot pivot away the longer arm portion 30c. This means that the nose 34 must give way to the surface 35 of the longer arm portion 30c. As a result of this, the guide pin 26b is moved towards the other end 28b of the arcuate slot 28. This movement causes the guide pin 24a of the slide 26, which slide is pivoted in the direction indicated by an arrow 26c, to be moved in the slot 27 towards the holding electromagnet device 15. The effect of this is that the limb 11 is, in fact, extended towards the electromagnetic holding device 15. As a result of this extension the limb 11 cannot move so far towards the holding electromagnet device 15 as described in the foregoing for the play position. The servo rod 14 performs the same travel and pivots the transport projection 19 with overtravel into its dash-dot position (FIG. 6), opposed by its spring 19a. Consequently, the head-mounting plate 3 is slightly out of the play position shown in FIG. 4 and the magnetic tape is not in intimate contact with the magnetic head 16. Thus the position for fast forward and reverse winding is reached. Moreover, the pressure rollers 17a and 17b are not applied to the associated capstans 18a, 18b.

If fast forward or reverse winding is to be terminated, the magnet coil 20 is de-energised. As a result of this the armature plate 24 is released from the polepieces 23c and the spring 37 can pivot the head-mounting plate 3 back into the rest or stand-by position (FIG. 5) in the anti-clockwise direction. When the construction just described is used this means that it is always necessary to return to the stand-by position before it is possible to switch to the play or fast-wind position.

The deck plate 1 carries two motors 40 and 41. The servo motor 40 serves for controlling the movements of the head-mounting plate and for driving the turntables 42, 43. The capstan motor 41 serves for driving the capstans 18a, 18b via a belt 44. This is effected via flywheels 45a, 45b. the belt 44 is passed around the flywheels 45a, 45b in an S-shape to obtain opposite directions of rotation of the capstans 18a, 18b. the motors are controlled via a microprocessor 46 arranged on a circuit board 47. The circuit board 47 is mounted on the deck plate 1.

The servo motor 40 drives a servo-mechanism comprising a worm shaft 48 and a reduction gear wheel 49, comprising two wheel sections 49a and 49b, and a central gear wheel 50. A pivotal arm 51 is pivotable about the spindle 50a of the central gear wheel 50 and pivotally supports a transmission gear wheel 52. The transmission gear wheel 52 is pivotable via a friction clutch, not shown, between the pivotal arm 51 and the central gear wheel 50, to drive either the turntable 42 or the turntable 43. The servo rod 14 is movable in its axial direction by means of a switching wheel 53. The switching wheel 53 belongs to a switching member 54 and is rotatably supported on an actuating limb 55 of the switching member 54. The switching member 54 further comprises a release limb 56 and a positioning limb 57. The switching member 54 is pivotable about a spindle 58 and is urged clockwise by means of a resilient arm 59. The deck plate 1 further carries a control switch 60 whose switch actuator 61 is adapted to cooperate with the positioning limb 57 of the switching member 54 and a switching projection 62 of the servo rod 14. The switching projection 61 assumes a central position when it is not loaded and can be pivoted out of this position to either side. In the central position the switch 60 is open and when the projection 61 is pivoted sideways the switch 60 is closed. Upon every new movement of the switching projection 61 and the switch 60 supplies a signal.

Figure 3:
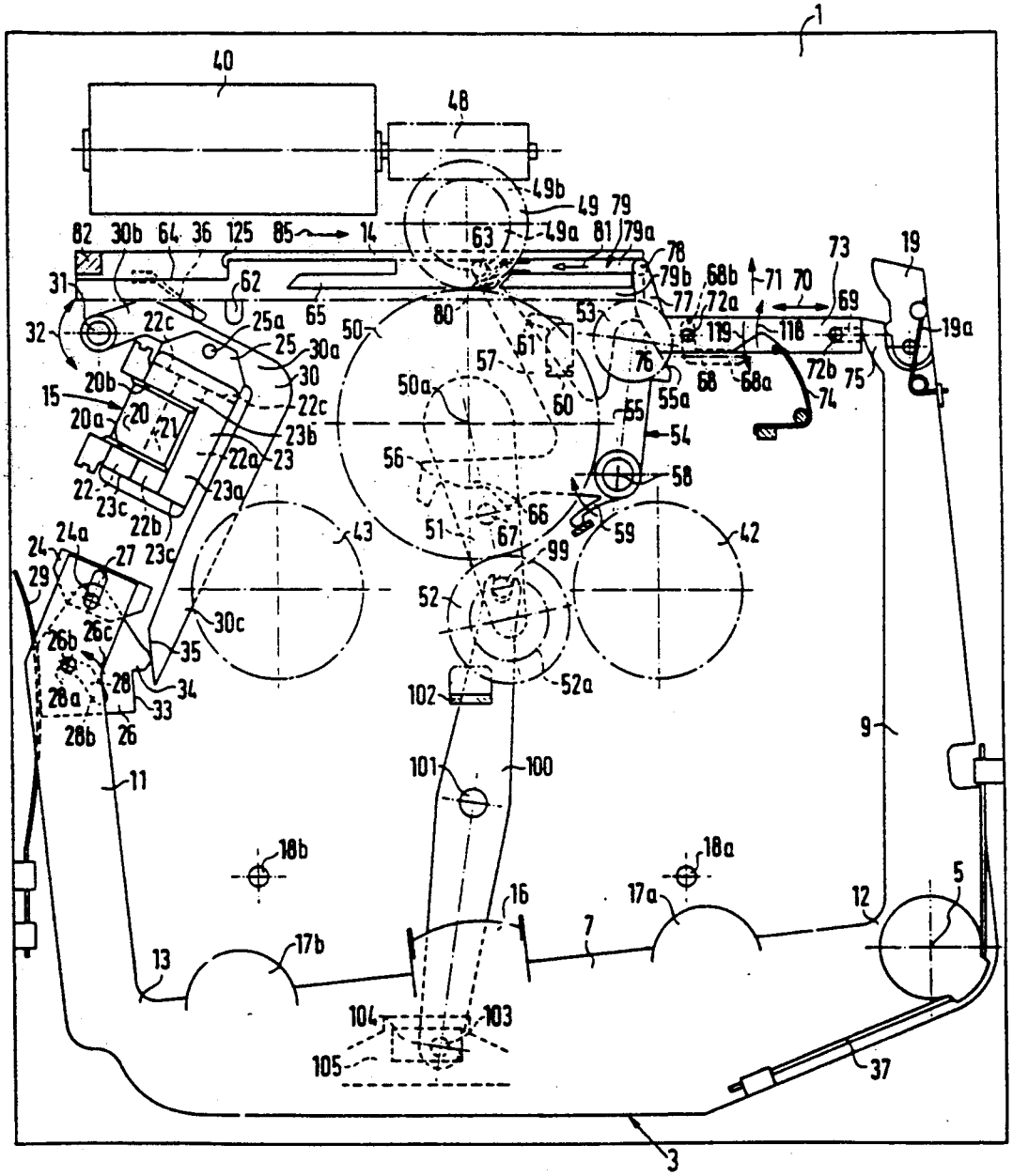
FIG. 3 is a diagrammatic view of the mechanism of the apparatus in the eject position.
Figure 6:
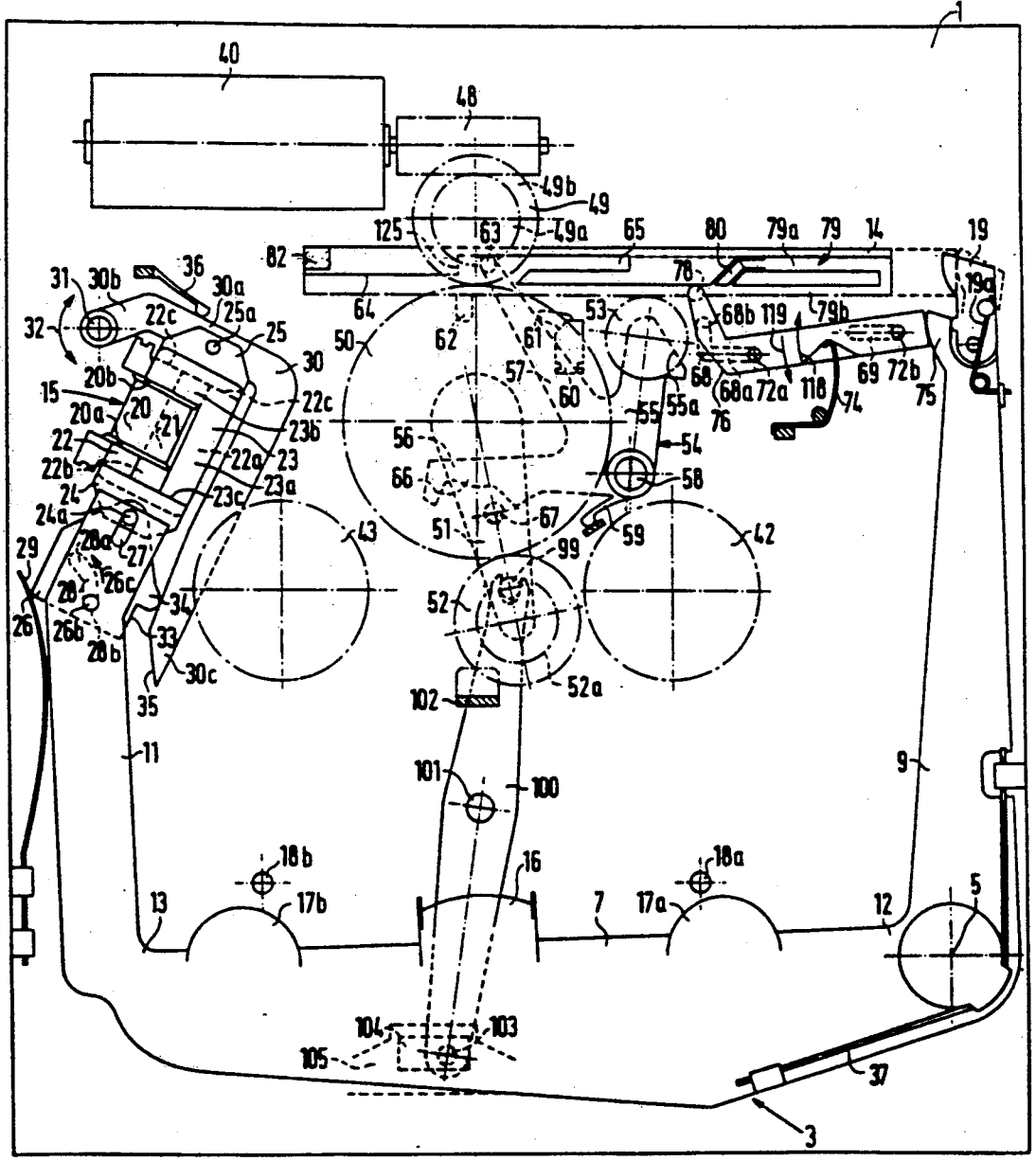
FIG. 6 shows the mechanism of FIG. 3 in a fast-wind position.

The positioning limb 57 carries a guide pin 63 whose position relative to the servo rod 14 is defined by this rod. A first defining position is shown in FIGS. 3, 4 and 6 and a second defining position is shown in FIG. 5. For positioning in the second position the servo rod comprises an edge 64. Thus, the servo rod determines, either directly via the slot 65 or indirectly via the control member 73, the position of the switching member 54 between the beginning and the end of servo-operation in which the deck changes over to a play mode or fastwind mode. The release limb 56 of the three-arm switching member 54 comprises a wide-jaw fork 66 which is adapted to cooperate with a limiting pin 67 on the pivotal arm 51.

In the deck plate 1 two slots 68 and 69 are formed. The slot 68 is L-shaped and the slot 69 is a straight slot which extends in the direction of movement of the servo rod 14. The direction of movement of the servo rod is indicated by a double arrow 70. The slot 68 has a slot portion 68a which extends in the direction indicated by the double arrow 70 and a portion 68b which extends perpendicularly thereto, in a direction perpendicular to the double arrow 70. This perpendicular direction is indicated by an arrow 71. The slots 68 and 69 are engaged by guide pins 72a, 72b of a control member 73. A spring 74 urges this control member 73 in two directions, inter alia towards a control projection 75 which is rigidly connected to the free end of the first limb 9. The control projection 75 is situated in the proximity of the transport projection 9. The second direction in which the control member 73 is urged by the spring 74 is indicated by the arrow 71. The control member 73 has an inclined surface 76 adapted to cooperate with an inclined surface 55a on the actuating limb 55. The control member 73 is L-shaped and comprises a short arm portion 77 carrying a follower pin 78. This follower pin is adapted to cooperate with a unidirectional guideway 79 in the servo rod 14. This unidirectional guideway comprises two paths 79a, 79b interconnected by a Schadow-type catch 80. This Schadow-type catch 80 is resilient in such a way that the follower pin can move past this catch in the direction indicated by an arrow 81 but not in the opposite direction. After the follower pin 78 has passed the Schadow-type catch 80 to enter the path 79b, it cannot return but has to follow the path 79b which extends in the direction indicated by the double arrow 70.

The servo rod 14 is provided with a coupling member 82 to establish the connection with a lift slide 83 of loading mechanism 87. This lift slide 83 comprises a projection 84 which can exert pressure on the coupling member 82 in the direction indicated by an arrow 85. The direction of the arrow 85 corresponds to the direction of insertion of a cassette 86 into a loading mechanism 87 to which the lift slide 83 belongs. The loading mechanism 87 comprises a lift compartment 88 adapted to receive the cassette 86.

The lift slide 83 is guided by a guide 89 so as to be axially movable in the direction indicated by the double arrow 70. The guide 89 forms part of a plastics element connected to the deck plate 1 in a manner not shown. The lift slide 83 as shown in FIG. 2 is substantially U-shaped, comprising a long limb 91, a base 92 and a short limb 93. The long limb 91 is formed with two inclined slots 94 in which pins 95 of the lift compartment 88 are guided. The short limb 93 is formed with an inclined surface 96 which is adapted to cooperate with a tab 97 of the lift compartment. In this way the lift compartment 88 is in principle guided at three points relative to the lift slide 83. Moreover, an over-center spring 98 acts on the plastics element 90 and on the long limb 91 of the lift slide 83.

The plastics element 90 has a horizontal edge surface 90a bounded by a vertical edge surface 90b. A further vertical edge surface extends parallel to the vertical edge surface 90b. The distance between the two vertical edge surfaces 90b and 90c corresponds to the distance between the pins 95, the pins 95 being movable between and along the vertical edges surfaces 90b and 90c.

FIG. 1 further shows that a pivotal arm 51 supporting the transmission gear wheel 52 is arranged between the turntables. The pivotal arm 51 has a pivot 99, which is engaged by an actuating lever 100 which is pivotable about a pivot 101. Within a range of the pivotal movement of the transmission gear wheel 52 a stationary gear segment 102 is arranged, with which segment the transmission gear wheel 52 can mesh. For this purpose the transmission gear wheel carries a gear wheel section 52a on is underside. At the end of the actuating lever 100 which is remote from the pivot 99 said lever 100 carries a pin 103 which is movable to a limited extent in a slot 104. The slot 104 is formed in a slide 105 comprising the pins 106 which are movable in slots 107 in the deck plate in a direction parallel to that indicated by the double arrow 70.

Eccentric discs 109 connected to gear segments 110 are mounted on the deck plate 1 so as to be pivotable about spindles 108. These gear segments 110 cooperate with toothed racks 111 of the slide 105. Thus, by a pivotal movement of the actuating lever 100 about the pivot 101 the pin 103, after it has reached one of the ends of the slot 104, can move the slide 105 in one of the directions indicated by the double arrow 70. During this movement the eccentric discs 109 are rotated. The pressure rollers 17a, 17b are supported in members 112a, 112b, which in their turn are pivotable about spindles 113. The spindles 113 are mounted on the head-mounting plate 3. The members 112a and 112b comprise pins 114 which are adapted to follow the cam surfaces of the eccentric discs 109. The members 112a and 112b are spring-loaded towards the capstans 18a, 18b by means of springs 115a, 11b. The springs 115a and 115b urge the pins 115 constantly against the eccentric discs 109.

Figure 7:
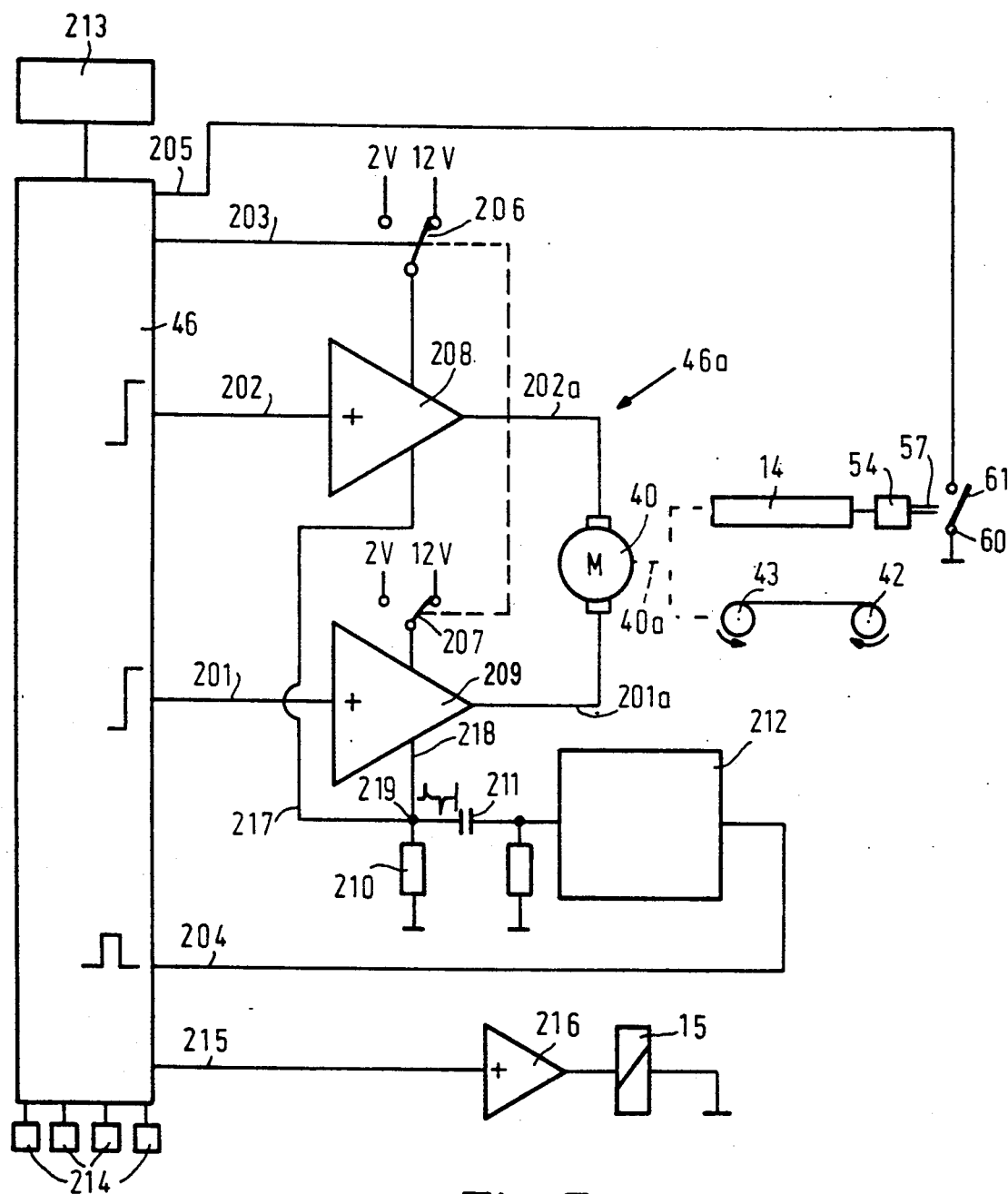
FIG. 7 shows a switching device of the deck.

FIG. 7 shows a circuit arrangement which serves for controlling all the tape deck functions. The microprocessor 46 comprises electronic control means for the apparatus and has a servo-drive control means which is comprised of an associated motor-control device 46a. The servo motor 40 of the deck is operated via a push-pull power amplifier comprising two power amplifiers 208 and 209, which are controlled by the microprocessor 46 via lines 201 and 202 and which are connected to the servo motor 40 via lines 201a and 202a.

The motor control device 46a switches the power supply to the power amplifiers 208 and 209 between 2 V and 12 V. Switching is effected by means of switches 206 and 207, which are controlled via a control line 203 of the microprocessor.

By means of a coupling 40a, shown in broken lines and comprising the gear wheel 53 and the switching member 54 of the servo motor 40 can be switched to the servo rod 14 or one of the turntables 42, 43. The switching member 54, which is represented only symbolically, can actuate the switch actuator 61 of the switch 60 by means of the positioning limb 57. Every actuation of the switch 60 gives rise to pulses which are supplied to the microprocessor 46 via the control line 205.

The current flowing through the servo motor 40 and the power amplifiers 208 and 209 is applied to an earthed resistor 210 via lines 217 and 218. Since the current flowing from the servo motor 40 via the lines 201a and 218 is pulsating as a result of the commutation interruptions, a pulsating voltage drop will appear on the terminal 219. These needle-like pulses are converted into rectangular pulses by means of a differentiating network 211 and a monostable 212 and are applied to the microprocessor 46 by lines 204. This microprocessor 46 counts and adds up the pulses. By means of a display 213 the added-up pulses can be displayed to provide a tape length indication and a direction-of-rotation-indication.

Keys 214 are provided by means of which the individual functions of the deck can be selected by hand. These functions may include, for example, reversal of the direction of tape transport, forward and reverse fast winding, and cassette ejection. All the keys 214 are connected to the microprocessor 46 to control the function selected by actuation of a key.

By means of a line 215 the microprocessor controls a power amplifier 216, which controls the electromagnetic holding device 15 in such a way that the head-mounting plate 3 can be held in the play position or in a fast wind position.

The switch 60 is an on/off switch whose turn-on and turn-off can be recognized as well-defined switching signals by the microprocessor 46. The microprocessor detects that the switch actuator 61 is released upon switching on and automatically moves to its central position and that the switch actuator 61 is moved out of its central position upon switching off. The on-position and the off-position indicate at which switching point within the cycle of movements of the servo mechanism the servo rod 14 and the switching member 44 are situated. During servo operation the microprocessor counts the rectangular pulses supplied by the monostable 212 in order to derive an actual time interval between the individual switching points, in which the servo mechanism has proceeded from one switching point to the other switching point. The microprocessor stores the time intervals required by the servo mechanism to proceed from one switching point to the other. The microprocessor verifies continually whether these time intervals are actually realized. If the nominal intervals are not realized within a specific tolerance the microprocessor automatically switches the servo motor 40 to the eject direction. Moreover, the microprocessor is constructed in such a way that it detects the functional position of the servo mechanism occupied before the last previously received switching signal.

If there is no cassette in the tape deck the parts of the deck are in a position relative to one another as shown in FIG. 3. If the apparatus is to be put into operation a cassette 86 is inserted into the lift compartment 88. When the cassette is inserted by hand the projection 84 of the lift slide sets the coupling member 82 in motion. When the lift slide 83 is moved inwards the servo rod 14 is also moved. The over-center spring 98 is now tensioned and when its over-center point is passed it pulls the lift slide further inwards without the cassette 86 being moved by hand. When the lift slide is moved further inwards the servo rod is also moved further in the direction of insertion 85. During this movement of the servo rod 14 the inclined surfaces 55a and 76 abut against one another and the switching member 54 is pivoted anti-clockwise. As a result of this the switching member 54 is pivoted anti-clockwise. As a result of this the switching wheel 53 coupled the central gear wheel 50 to the servo rod. The pivotal movement of the switching member 54 also results in the switching projection 61 being released by the positioning limb 57, i.e. the switch 60 being opened.

A switching pulse generated upon opening is detected by the microprocessor 46. The microprocessor then detects that the switch 60 is open; it sets the motor control inputs 201, 202 and 203 in such a way that the servo motor 40 can start in the desired servo loading direction with a voltage of 12 V. The power amplifiers 208 and 209 supply the full 12 V supply voltage to the servo motor 40. The mechanically coupled servo motor 40 now moves the servo rod 14 further in the direction of insertion 85. Now the projection 84 need no longer drive the coupling member 82 and the lift slide is moved further in the direction of insertion 45 merely by the force of the over-center spring, which movement continues until the pins 95 can slide down the vertical edge surfaces 90b and 90c, the pins 95 also sliding downwards in the inclined slots 94. At the same time the tab 97 slides down the inclined surface 96. This downward movement ceases when the lift slide 93 has reached its rearward end position shown in FIG. 2. In this position the lift compartment 88 has reached its rearmost and lowermost position and the cassette 86 is engaged by the winding spindles 116, 117.

During the movement of the servo rod 14 in the direction indicated by the arrow 85 the follower pin 78 of the control member 73 has entered the path 79a in the direction indicated by the arrow 81. The follower pin 78 assumes the entry position under the influence of the spring 74. The control member 73 has then pivoted about the guide pin 72b. This pivotal movement is indicated by the arrow 118. The follower pin 78 enters the path 79b via the Schadow-type catch 80. The control member 73 is then pivoted in the direction indicated by an arrow 119.

When the switching member 54 is pivoted to open the switch, the limiting pin 67 engages between the arms of the wideOjaw fork 66. The fork 66 has shifted the limiting pin 67 so far that the transmission gear wheel 52 is pressed away from the relevant turntable 42 or 43. As a result of the pivotal movement of the switching member 54 the servo motor drive 48a has switched off the turntable drive at the same time that it is coupled to the servo (servo rod) drive. This means that the servo motor drive is a dual-function drive which in the servo mode cooperates with the servo rod 14 and in the fast winding or play mode cooperates with one of the turntables 42, 43.

The drive of the servo rod 14 via the switching wheel 53 is self-locking in the outward direction, i.e. the direction opposite to that indicated by the arrow 85. This means that in the stand-by position shown in FIG. 5 the guide pin 63 is retained in a corner portion 125 between the edge 64 and the slot 65. This is the position in which the wide-jaw fork 66 acts against the limiting pin 67 and urges the transmission gear wheel 52 away from the turntable 42 or 43. In the inward direction indicated by the arrow 85, however, the drive by means of the switching wheel 53 is self-releasing. This means that the switching wheel can automatically become disengaged from the central gear wheel when the servo rod performs a pulling movement, if the control member 73 does not limit the path of movement. In the opposite outward direction the self-locking feature of the switching wheel 53 ensures that the guide pin 63 remains in the corner portion 125 without any special guiding measures.

In order to reach the play position shown in FIG. 4 from the starting point, in which the switch 60 is opened, the servo rod 14 moves as far to the right as is indicated in broken lines in FIG. 4. In this position the servo rod 14 has already pivoted the head mounting plate 3 into its play position, as can be seen in FIGS. 1 and 4, in a manner as described above. In the extreme right-hand position of the servo rod 14 (first switching point, i.e. head-mounting plate in the play position) the switching projection 62 of the servo rod 14 abuts against the switch actuator 61 and closes the switch 60. This closure gives rise to a switching pulse, which is applied to the microprocessor 46 via the line 205. The microprocessor then detects the first reversal point and controls the inputs 201 and 202 in such a way that the power amplifiers 208 and 209 stop the motor 40 and, after a safety margin of approximately 150 ms, start this motor in the opposite direction of rotation. In order to preclude seizure an overload coupling, not shown, is arranged between the gear wheels 49a and 49b. At the same time the microprocessor switches on the electromagnetic holding device 15. Thus, the head mounting plate is held in the play position. The microprocessor has compared the actual time interval between the starting instant and the first reversal instant with the nominal time interval stored by this microprocessor. If the actual time interval has exceeded the nominal time interval the microprocessor will automatically reset the servo motor 40, i.e. switch said motor to the eject direction.

When the gears abut against the switch actuator 61, insertion and lowering of the cassette is completed. The microprocessor 46 starts the servo motor 40 in the opposite direction. The servo rod 14 again moves in the opposite direction. The switch 60 opens; it supplies a switching pulse, which is detected by the microprocessor as the second reversal point.

The microprocessor detects that the servo drive is proceeding from the second reversal point to the servo end point, where a change-over to the fast-winding of play mode is obtained. Briefly before the servo end point is reached the control member 73 and the switching member 54 are disengaged from one another. The force of the spring 59 pivots the switching member 54 clockwise, causing the limiting pin 67 to be disengaged from the wide-jaw fork 66.

As a result of this disengagement the pivotal arm 51 can apply the transmission gear wheel 52 to the turntable 42, 43. Thus, during the pivotal movement of the switching member 54 the servo motor drive 48 is set from servo operation (the switching member 54 has moved the switching wheel 52 away from the central wheel 50; this position is represented by the mechanical coupling 40a shown in broken lines in FIG. 7) to turntable drive. At the same time the pressure roller 17a/17b is applied to the associated capstan 18a/18b by means of the pivotal arm 51 and the actuating lever 100. During the clockwise pivotal movement the positioning limb 57 actuates the switch actuator 61 and the switch 60 is closed.

At this servo end point the switch supplies a switching pulse to the microprocessor 46 via the line 205. Again the microprocessor 46 has compared the actual time interval with a nominal time interval and has ascertained that the nominal time interval is correct. Consequently, the servo process can be continued. In order to tension the tape the microprocessor 46 switches the servo motor to 12 V without current limitation, for example, for 25 ms. Subsequently, it switches over to 12 V with current limitation for 250 ms. In this time interval the microprocessor starts the capstan motor 41. As a result of this, the play mode begins with a high torque. Upon expiry of the 250 ms the microprocessor switches the servo motor 40 from 12 V to 2 V via the line 203 and the two switches 206 and 207. The servo motor 40 then continues to operate with a smaller torque. The servo mechanism is now switched off and the deck plays a cassette.

The actuating lever 100 has moved the slide 105 to the left in the direction indicated by an arrow 120 for the purpose of pressure-roller actuation. The toothed racks 111 have rotated the eccentric discs 109 clockwise via the gear segments 110. The pin 114 of the right-hand member 112a has then left the surface 121 of the eccentric disc 109 and has abutted against an edge 122, said pin 114 being constantly urged against the edge 122 by the spring 115a. Simultaneously the pressure roller 17a is applied to the capstan 18a. At the same time the movement of the pin 114 from the surface 121 to the edge 122 via a corner portion 123 has resulted in the movement of the slide 105 in the direction indicated by the arrow 120, which movement has been initiated by the actuating lever 100, being taken over by the pin 114. Since the pin 114 of the right-hand eccentric disc 109 has now run onto the low edge 122, the pin 114 of the left-hand eccentric disc 109 has moved from the edge 122 onto the surface 121 via the corner portion 123. As a result of this the member 112b is pivoted clockwise against the force exerted by the spring 115b and the pressure roller 17b is lifted off the capstan 18b.

Electrical control of the deck is always effected via the one switch 60 and the microprocessor 46. External control commands are always applied to the microprocessor 46 via keys 214 or the like.

End of tape, i.e. stopping of the motor 40, is also detected via the microprocessor 46. The current flowing in the servo motor 40 also flows through a resistor 210 (FIG. 7). As a result of the commutation interruptions of the current in the dc servo motor 40 the current in the resistor 210 will also pulsate. The pulsating current through the resistor 210 will produce a pulsating voltage drop across the resistor 210. The voltage pulses are differentiated in a differentiating network 211. The differentiated voltage triggers a monostable multivibrator 212. The trigger pulses are applied to the microprocessor 46 via the line 204 in order to be counted. If the pulses do not appear as a result of tape stoppage, the microprocessor 46 detects tape stoppage and reverses the direction of rotation of the motor by changing the drive of the power amplifiers 208, 209 via the lines 201, 202.

This reversal of the direction of rotation causes the actuating lever 100 to move the slide 105 initially in the direction indicated by an arrow 124 until the pin 114 on the left-hand eccentric disc 109 has moved past the corner portion 123 and the pin 114 has taken over the movement of the slide 105 in the direction indicated by the arrow 124 via the edge 122. The pressure roller 17a has then become disengaged from the capstan 18a and the pressure roller 17b is applied to the capstan 18b. At the same time the transmission gear wheel 52 is pivoted from the turntable 42 to the turntable 43. During the reversal of the direction of rotation the switches 206 and 207 are briefly connected to 12 V by the microprocessor in order to speed up the switching process.

If the play mode is to be terminated, which can be effected for example by actuation of a key, the microprocessor 46 causes the holding magnet device 15 to be de-energised via the control line 215 and the amplifier 216 to set the head-mounting plate to the stop position by an anti-clockwise pivotal movement under the influence of the spring 37. This pivotal end position is illustrated in FIG. 5. The transport projection 19 has then abutted against the right-hand end of the servo rod 14. At the same time the control projection 75 has moved the control member 73 to the left to engage with the inclined surface 55a of the switching member 54. Now the switching wheel 63 again couples the central gear wheel 50 to the servo rod 14. At the same time the wide-jaw fork 66 has pivoted the limiting pin 67 so far to the center that the transmission gear wheel 52 is no longer in mesh with the turntable 42. As a result of the anti-clockwise movement of the switching member 54 the positioning limb 57 has released the switch actuator 61. For the microprocessor 46 this release means that a new command will be applied. This command is obtained by depression of an actuating key. From this key the logic circuit 46 receives information on how to proceed. The following situations are possible:

1. If stand-by is desired, the microprocessor 46 turns off the motor 40.

2. If eject is desired, as illustrated in FIG. 3, the servo rod 14 is moved to the left, which results in the cassette 86 being ejected via the coupling member 82. The cassette is ejected by the over-center spring 98. The switch 61 is closed upon termination of the ejection process and the microprocessor 46 detects that it can switch off the servo-motor 40.

3. If fast forward or reverse operation is desired, the holding magnet device 15 is energised as described in the foregoing and the servo rod 14 is moved to the right as is shown in FIG. 6. As a result of the extension of the arm 11 the head-mounting plate cannot reach the play position. In this position the microprocessor ensures that the motor has a large driving torque in order to obtain a fast tape transport by applying a voltage of 12 V to the motor.

4. If again the play mode is desired, the microprocessor 46 ensures that the servo rod 14 is again moved to the right (FIG. 4), causing the head-mounting plate to be pivoted into its play position.

The deck can also be switched off at any instant during servo operation; it is then held in the off-position in which the head mounting plate is not actuated. When the deck is switched on again the servo motor 40 is first started in the eject direction for the purpose of resetting. The servo rod 14 travels to the left up to the next switching point and detects this point. After this detection the servo operations proceed as described above.

During playing or fast winding the pulses applied to the microprocessor 46 by the monostable multivibrator 212 via the line 204 are counted and displayed. This pulse counting provides tape-length and direction indication.

The servo motor 40 drives a servo motor drive 48a, which is constructed as a dual-function drive comprising reduction-gear trains adapted to the servo rod drive and the turntable drive. The efficiency of the reduction gear mechanism for the turntable drive is optimized in such a way that the speed torque characteristic of the servo motor 40 acting at the turntable is adapted to the winding torque/winding speed characteristic at the turntables so that the turntables can be driven without an interposed friction coupling. The drive mechanism between the servo motor 40 and the turntables 42 and 43 comprises the worm shaft 48, the reduction gear wheel 49 comprising two gear wheel sections 49a and 49b connected by an overload coupling, the central gear wheel 50 an the transmission gear wheel 52. Consequently, these parts include all the gear wheels between the shaft of the servo motor 40 and the turntable 42 or 43.

The winding torque at the take-up turntable varies as the tape-roll diameter changes or the turntable speed varies accordingly. In the case of a small tape-roll diameter the winding torque is large and the speed of the take-up turntable will also be high. In the case of a large tape-roll diameter the winding torque at the take-up turntable will be small and the speed of the take-up turntable will also be small. At the same time the torque of a dc servo motor is high in the case of a low speed and low in the case of a high speed. By a suitable choice or adaptation of the speed torque characteristics it can be achieved that the tape pull is substantially constant as the diameter of the pulling tape-roll varies between a small rapidly rotating roll and a large slowly rotating roll.

Figure 8:
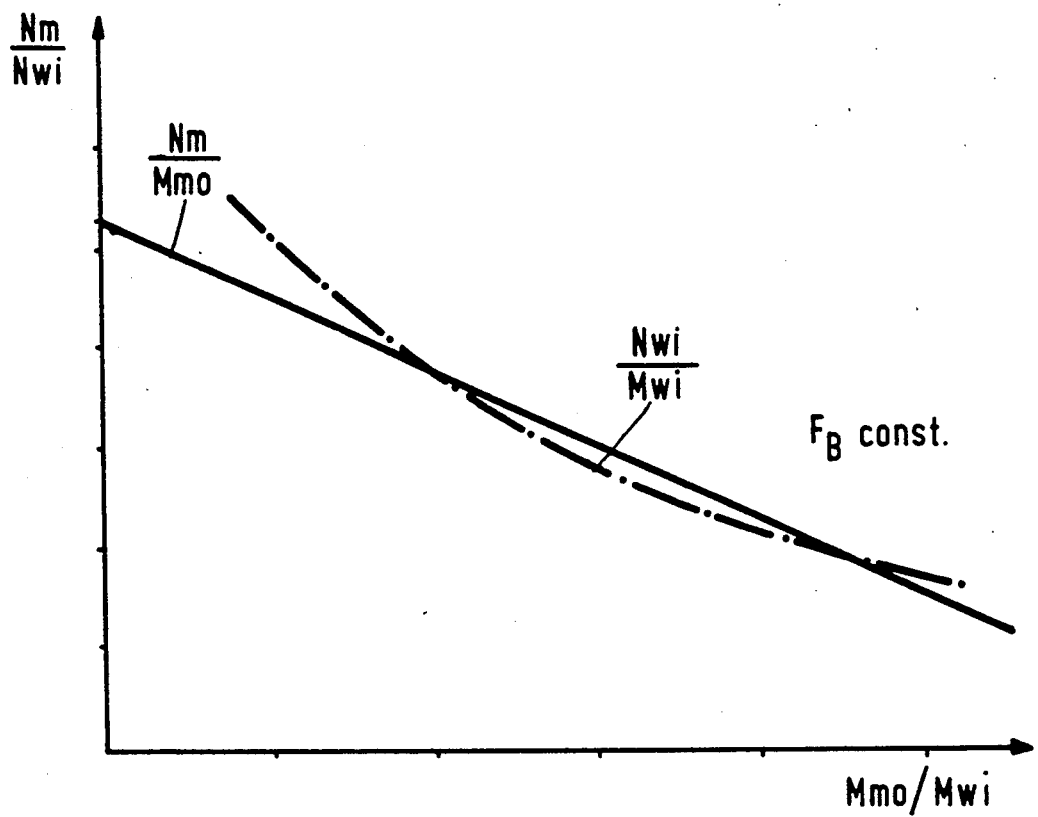
FIG. 8 shows characteristics for comparison between the servo-motor torque and the required winding torque.
Figure 9:
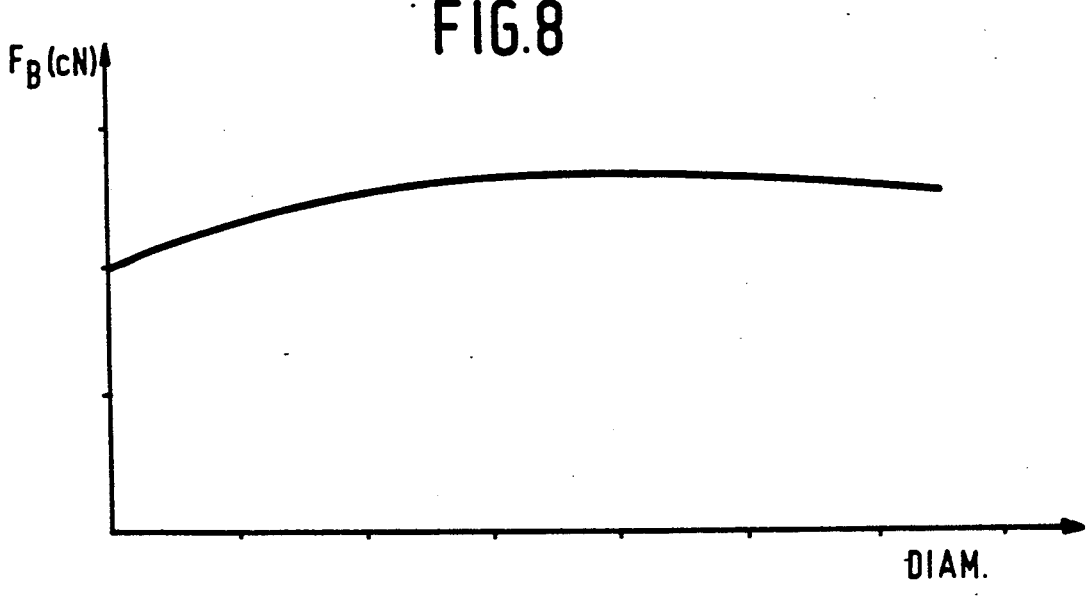
FIG. 9 shows a characteristic with compensated pulling force.

This situation is illustrated in FIGS. 8 and 9. The solid characteristic $N_m/M_{mo}$ shows that the motor speed $N_m$ decreases substantially linearly as the motor torque increases. The dash dot characteristic shows that as the speed $N_{wi}$ decreases while the tape pull is constant ($F_b$—const.) and the winding torque $M_{wi}$ required at the turntable also increases, the characteristic $N_{wi}/M_{wi}$ being curved. The positions of the characteristic can be adapted to one another in a central range by adjusting the efficiency of the mechanism, so that eventually a substantially constant pulling force $F_B$, measured in cN, is obtained at the turntables, as is illustrated in FIG. 9, in spite of the varying diameter of the pulling tape-roll. This enables a friction coupling which compensates for said torque differences to be dispensed with.

We claim:

1. A magnetic- tape cassette apparatus having capstans for driving a magnetic tape of a tape cassette loaded in said apparatus, a capstan drive means for driving said capstans, a pair of rotatable turntables for driving winding spindles of a loaded tape cassette, a head-mounting plate movable between a rest position, a play position, and a fast-wind position, electromagnetic holding means for holding said head mounting plate in said play and fast-wind positions, an axially movable servo rod for moving said head mounting-plate from said rest position towards said play and fast-wind positions, servo drive means for moving said servo rod and driving said turntables, and electronic control means for controlling the functioning of the apparatus, the improvement comprising:

said servo drive means comprises a movable switching member arranged such that said servo rod controls the position of said switching member during axial movement of said servo rod, said switching member being movable independent of the servo rod when said servo rod is stationary;

switching means actuatable between a plurality of actuation states by said servo rod and said switching member for supplying switching signals to said control means upon actuation by said servo rod or said switching member; and said electronic control means comprising memory means for storing switching signals from said switching means, deriving means for deriving the instantaneous geometrical position of said servo rod and switching member and the actuation state of said switching means from the last stored switching signal received from said switching means, and converting means for converting the switching signal from said switching means into control commands for said servo drive means, said capstan drive means, and said electromagnetic holding means.

2. A magnetic tape cassette apparatus according to claim 1, further comprising biasing means for moving said switching member toward said switching means, said servo rod, in a predetermined position for initiating the playing of a cassette, allowing said biasing means to rotate said switching member and actuate said switching means, said rotation of said switching member being effective for causing said servo drive means to switch from driving said servo rod to driving said turntables and said actuation of said switch causing said electronic control means to supply a voltage to said servo motor for driving said turntables.

3. A tape cassette apparatus as claimed in claim 1, characterized in that said switching means is comprised of a switch having open and closed actuation states and a switch actuator engageable by said servo rod and switching member for opening and closing said switch, said switch supplying a switching signal to said electronic control means when opened and closed.

4. A tape cassette apparatus as claimed in claim 1, further comprising a voltage supply for generating a low voltage and a high voltage, said servo drive means comprises a servo motor connected to said voltage supply, and said electronic control means controls the direction of rotation of said servo motor and switches said voltage supply connected to said servo motor between the high supply voltage for moving said servo rod and for fast winding said turntables and the low supply voltage for driving said turntables with said head mounting plate in the the play position.

5. A tape cassette apparatus as claimed in claim 4, further comprising push-pull power amplifiers electrically connected to said servo motor, said voltage supply, and said electronic control means, said push-pull amplifiers being controlled by said electronic control means for operating said servo motor.

6. A tape cassette apparatus as claimed in claim 5, further comprising voltage supply lines connecting said voltage supply to said power amplifiers, and a pulse detector for detecting operating functions of said servo motor via said voltage supply lines.

7. A magnetic tape cassette apparatus as claimed in claim 6, characterized in that said servo motor causes a pulsating direct voltage in said voltage supply lines and, a differentiating network for deriving pulses from the pulsating direct voltage of said motor is electrically connected to said voltage supply lines of said power amplifier.

8. A tape cassette apparatus as claimed in claim 7, characterized in that a monostable multivibrator is electrically connected to said differentiating network and said electronic control means, said monostable multivibrator comprising means for generating square-wave pulses for said electronic control means from the pulses from said differentiating network, and said electronic control means comprising pulse counting means for counting the square-wave pulses so as to derive time values for said servo motor.

9. A tape cassette apparatus as claimed in claim 8, further comprising a loading and eject means for moving a tape cassette between an eject position and a load position, and vice versa, said loading and eject means being coupled to said servo drive means, and said electronic control means comprises stored nominal time intervals and means for determining the actual time intervals between successively received switching signals from said switching means and for comparing the actual time intervals with the stored nominal time intervals, said electronic control means switching said servo motor to a direction of rotation for causing said loading and eject means to move said cassette to said eject position if the difference between any of said nominal time intervals and a respective actual time interval exceed a predetermined limit.

10. A magnetic tape cassette apparatus as in claim 9, wherein said servo drive means comprises a dual-function drive for driving said servo rod and said turntables, said servo drive means comprising a reduction gear train for driving said turntables, said reduction gear train being arranged such that the speed-torque characteristics of said servo motor acting at said turntables causes a substantially constant tape pull force.

11. A magnetic-tape cassette apparatus having a servo motor, a head mounting plate moveable between a plurality of positions, and having a magnetic head mounted thereon, means for moving a magnetic tape of a cassette loaded in said apparatus past said magnetic head in one of said positions of said head mounting plate, and a servo rod moveable with a plurality of predetermined axial movements for moving said head mounting plate among said plurality of positions, servo drive means coupleable to said motor and said servo rod for axially moving said servo rod, and electronic control means for controlling the functioning of the apparatus, the improvement comprising:
- a moveable switching member cooperable with said servo rod such that the position of said switching member is independent of said servo rod for predetermined axial positions of said servo rod and is controlled by said servo rod for other positions of said servo rod;
- switching means having a plurality of actuation states and being actuatable by said servo rod and said switching member at predetermined positions of said servo rod and switching members for supplying switching signals to said control means; and
- said electronic control means comprising
  - means for determining the geometrical position of said servo rod and said switching member and the actuation state of said switching means from the switching signals supplied by said switching means, and
  - means for controlling said motor from said determined geometrical positions for controlling the axial movement of said servo rod.

12. A tape cassette apparatus according to claim 11, wherein said electronic control means comprises: stored nominal time intervals between successive switching signals for respective said predetermined axial movements of said servo rod and movement of said switching member; means for recognizing the respective one of said predetermined axial movements of said servo rod; and means for measuring the actual time intervals between successive switching signals and comparing the measured time intervals with the respective nominal time interval of said recognized one axial movement of said servo rod.

13. A tape cassette apparatus according to claim 12, wherein said electronic control means causes a predetermined one of said plurality of axial movements of said servo rod if the actual time interval is greater than the respective nominal time interval.

14. A tape cassette apparatus according to claim 12, wherein:
- said servo rod comprises a switching projection;
- said switching member comprises a positioning limb engaged with said servo rod; and
- said switching means is comprised of a switch having a switch actuator, said switch being moveable among a central open position and a respective closed position on either side of said central position by engagement of said switching projection and said positioning limbs with said switch actuator;
- said microprocessor sensing each actuation of said switch from one position to another.

15. A tape cassette apparatus according to claim 11, wherein:
- said servo rod comprises a switching projection;
- said switching member comprises a positioning limb engaged with said servo rod; and
- said switching means is comprised of a switch having a switch actuator, said switch being moveable among a central open position and a respective closed position on either side of said central position by engagement of said switching projection and said positioning limbs with said switch actuator;
- said microprocessor sensing each actuation of said switch from one position to another.

16. A tape cassette apparatus as claimed in claim 11, further comprising a power supply for generating a low voltage and a high voltage, said servo motor being connected to said power supply, and said electronic control means controlling the direction of rotation of said servo motor and switches said power supply connected to said servo motor between the high supply voltage for moving said servo rod and for moving said tape at a first, fast speed and the low supply voltage for moving said tape at a second slower speed.

17. A tape cassette apparatus as claimed in claim 16, further comprising push-pull power amplifiers electrically connected to said servo motor, said voltage supply, and said electronic control means, said push-pull amplifiers being controlled by said electronic control means for operating said servo motor.

18. A tape cassette apparatus as claimed in claim 17, further comprising voltage supply lines connecting said power supply to said power amplifiers, and a pulse detector for detecting operating functions of said servo motor via said voltage supply lines.

19. A tape cassette apparatus as claimed in claim 18, characterized in that said servo motor causes a pulsating direct voltage in said voltage supply lines, and
- a differentiating network for deriving pulses from the pulsating in direct voltage of said motor is electrically connected to said voltage supply lines of said power amplifier.

20. A tape cassette apparatus as claimed in claim 19, characterized in that a monostable multivibrator is electrically connected to said differentiating network and said electronic control means, said monostable multivibrator comprising means for generating square-wave pulses for said electronic control means from the pulses from said differentiating network, and said electronic control means comprising pulse counting means for counting the square-wave pulses so as to derive time values for said servo motor.

* * * * *